(12) United States Patent
Wang (10) Patent No.: US 12,120,457 B2
(45) Date of Patent: Oct. 15, 2024

(54) CONFERENCE CREATION METHOD, TERMINAL, SERVER END, AND STORAGE MEDIUM

(71) Applicant: ZTE Corporation, Shenzhen (CN)

(72) Inventor: Zhou Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 119 days.

(21) Appl. No.: 17/777,085

(22) PCT Filed: Dec. 10, 2020

(86) PCT No.: PCT/CN2020/135266
§ 371 (c)(1),
(2) Date: May 16, 2022

(87) PCT Pub. No.: WO2021/121122
PCT Pub. Date: Jun. 24, 2021

(65) Prior Publication Data
US 2022/0400229 A1  Dec. 15, 2022

(30) Foreign Application Priority Data
Dec. 16, 2019 (CN) .......................... 201911291695.2

(51) Int. Cl.
*H04N 7/15* (2006.01)
*H04L 12/18* (2006.01)
(52) U.S. Cl.
CPC ........... *H04N 7/15* (2013.01); *H04L 12/1818* (2013.01)
(58) Field of Classification Search
CPC ...... H04N 7/15; H04N 7/147; H04L 12/1818; H04L 65/1069; H04L 65/1089;
(Continued)

(56) References Cited

U.S. PATENT DOCUMENTS

| 6,665,392 | B1 | 12/2003 | Wellner | |
|---|---|---|---|---|
| 2010/0281129 | A1* | 11/2010 | Cha | ...................... H04L 12/1818 |
| | | | | 709/227 |
| 2016/0247522 | A1* | 8/2016 | Namboodiri | ............ H04M 3/56 |

FOREIGN PATENT DOCUMENTS

| CN | 101272266 A | 9/2008 |
|---|---|---|
| CN | 101646056 A | 2/2010 |

(Continued)

OTHER PUBLICATIONS

International Search Report for corresponding application PCT/CN2020/135266 filed Dec. 10, 2020; Mail date Mar. 8, 2021.

(Continued)

*Primary Examiner* — Yosef K Laekemariam
(74) *Attorney, Agent, or Firm* — CANTOR COLBURN LLP (57) ABSTRACT

Embodiments of the present disclosure relate to the technical field of communications. Disclosed are a conference creation method, a server end, a terminal, and a storage medium. In the present disclosure, the conference creation method is applied to a video conference terminal. The method includes: establishing a point-to-point video conference with an opposite-end device, and obtaining an identity identifier of the opposite-end device; generating a data conference creation request containing identity identifiers of two parties of the conference, wherein the two parties of the conference include the video conference terminal and the opposite-end device; and transmitting the data conference creation request to a data conference server end, so that the data conference server end creates a data conference corresponding to the point-to-point video conference according to the identity identifiers of the two parties of the conference.

17 Claims, 5 Drawing Sheets

(58) Field of Classification Search
CPC .............. H04L 65/4015; H04L 65/4025; H04L 65/4038; H04L 12/18
See application file for complete search history.

(56) References Cited

FOREIGN PATENT DOCUMENTS

| | | |
|---|---|---|
| CN | 101771854 A | 7/2010 |
| CN | 104135484 A | 11/2014 |
| CN | 104363409 A | 2/2015 |
| CN | 208094697 U | 11/2018 |
| CN | 109788229 A | 5/2019 |

OTHER PUBLICATIONS

European Search Report for corresponding application EP20902916; Report dated Jan. 18, 2023.

\* cited by examiner

CONFERENCE CREATION METHOD, TERMINAL, SERVER END, AND STORAGE MEDIUM

CROSS-REFERENCE TO RELATED APPLICATION

The present disclosure claims priority to Chinese patent application No. CN201911291695.2, filed on Dec. 16, 2019, and entitled "Conference Creation Method, Terminal, Server End, and Storage Medium", the disclosure of which is hereby incorporated by reference in its entirety.

TECHNICAL FIELD

Embodiments of the present disclosure relate to the technical field of communications, and particularly to a conference creation method, a server end, a terminal, and a storage medium.

BACKGROUND

In a present cloud conference system, a point-to-point video conference and a multi-party conference are implemented by different mechanisms. The point-to-point video conference is implemented by direct video communication between terminals without any video conference management platform. The multi-party conference is implemented based on a video conference management platform, and the video conference management platform may further notify data conference service to synchronously create a data conference during the creation of a video conference. That is, the video conference and the data conference may be implemented at the same time in the multi-party conference.

However, there is the following problem in some cases: a data conference is initiated to be created by a video conference management platform, and a point-to-point video conference is independent of the video conference management platform, and thus cannot be cooperate with the data conference.

SUMMARY

An objective of the embodiments of the present disclosure is to provide a conference creation method, a terminal, a server end, and a storage medium.

In order to solve the foregoing technical problem, an embodiment of the present disclosure provides a conference creation method, which is applied to a video conference terminal and includes that: a point-to-point video conference is established with an opposite-end device, and an identity identifier of the opposite-end device is obtained; a data conference creation request containing identity identifiers of two parties of the conference is generated, wherein the two parties of the conference include the video conference terminal and the opposite-end device; and the data conference creation request is sent to a data conference server end, so that the data conference server end creates a data conference corresponding to the point-to-point video conference according to the identity identifiers of the two parties of the conference.

An embodiment of the present disclosure also provides a conference creation method, which is applied to a data conference server end and includes that: a data conference creation request sent by a video conference terminal after establishing a point-to-point video conference with an opposite-end device is received, the data conference creation request containing identity identifiers of two parties of the conference, and the two parties of the conference including the video conference terminal and the opposite-end device; and a data conference corresponding to the point-to-point video conference is created according to the identity identifiers.

An embodiment of the present disclosure also provides a conference creation method, which is applied to a conventional terminal and includes that: a point-to-point video conference is established with a video conference terminal, so that the video conference terminal sends a data conference creation request containing identity identifiers of two parties of the conference to a data conference server end, and the data conference server end, after creating a data conference, generates a conference access code of the conventional terminal, and sends the conference access code to the video conference terminal to notify a user; a data conference access interface is provided; and the conference access code input by the user is received through the data conference access interface, and the data conference is accessed according to the conference access code and an identity identifier of the conventional terminal.

An embodiment of the present disclosure also provides a video conference terminal, including: at least one processor; and a memory in communication connection with the at least one processor, wherein the memory stores an instruction executable for the at least one processor; and the instruction is executed by the at least one processor to enable the at least one processor to execute the conference creation method.

An embodiment of the present disclosure also provides a data conference server end, including: at least one processor; and a memory in communication connection with the at least one processor, wherein the memory stores an instruction executable for the at least one processor; and the instruction is executed by the at least one processor to enable the at least one processor to execute the conference creation method.

An embodiment of the present disclosure also provides a conventional terminal, including: at least one processor; and a memory in communication connection with the at least one processor, wherein the memory stores an instruction executable for the at least one processor; and the instruction is executed by the at least one processor to enable the at least one processor to execute the conference creation method.

An embodiment of the present disclosure also provides a computer-readable storage medium, storing a computer program which is executed by a processor to implement the conference creation method.

BRIEF DESCRIPTION OF THE DRAWINGS

One or more embodiments are described exemplarily through the pictures in the corresponding drawings. These exemplary descriptions do not limit the embodiments. The components marked with the same reference numerals in the drawings represent similar components. Unless specifically stated, the pictures in the drawings do not form limitations on scale.

DETAILED DESCRIPTION OF THE EMBODIMENTS

In order to make the objective, technical solutions, and advantages of the embodiments of the present disclosure clearer, each embodiment of the present disclosure will be described below in combination with the drawings in detail. However, it can be understood by those of ordinary skill in the art that, in each embodiment of the present disclosure, many technical details are proposed to make readers understand the present application better. However, the technical solutions claimed by the present application may also be implemented even without these technical details and various variations and modifications made based on each of the following embodiments. The division of each of the following embodiments is for ease of description and should not form any limitation on specific implementation modes of the present application. Each embodiment can be combined with and refer to each other without conflicts.

Figure 1:
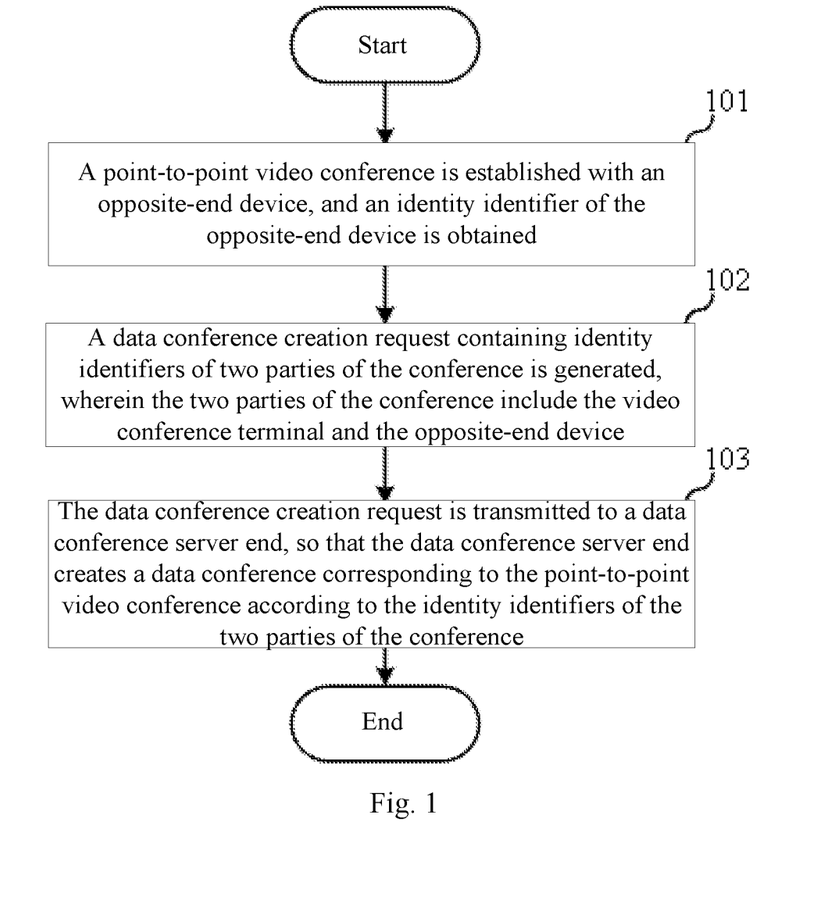
FIG. 1 is a flowchart of a conference creation control method according to a first embodiment of the present disclosure.

A first embodiment of the present disclosure relates to a conference creation method, which is applied to a video conference terminal. A specific flow is shown in FIG. 1.

In Step 101, a point-to-point video conference is established with an opposite-end device, and an identity identifier of the opposite-end device is obtained.

In Step 102, a data conference creation request containing identity identifiers of two parties of the conference is generated, wherein the two parties of the conference include the video conference terminal and the opposite-end device.

In Step 103, the data conference creation request is transmitted to a data conference server end, so that the data conference server end creates a data conference corresponding to the point-to-point video conference according to the identity identifiers of the two parties of the conference.

Implementation details about the data conference creation method of the embodiment will specifically be described below. The following contents are only implementation details provided for ease of understanding, and are optional for the implementation of the solution.

The conference creation method of the embodiment is applied to the video conference terminal, and two parties of the point-to-point video conference include the video conference terminal and a corresponding opposite-end device. The opposite-end device may be another video conference terminal, or a conventional terminal. The conventional terminal in the embodiment refers to a terminal device capable of running a code program, such as a mobile phone and a personal computer. That is, a data conference may also be supported in the point-to-point video conference between the video conference terminal and the conventional terminal.

The video conference terminal is integrated with an application supporting a video conference and an application supporting a data conference. The video conference terminal establishes the point-to-point video conference with the opposite-end device based on the application supporting a video conference, and obtains an identity identifier of the opposite-end device. After the point-to-point video conference is established successfully, the application supporting a video conference in the video conference terminal may notify the application supporting a data conference. The application supporting a data conference, after receiving the notification, may generate a data conference creation request, the data conference creation request containing identity identifiers of two parties of the conference, and send the data conference creation request to a data conference server end. The conventional terminal in the embodiment is installed with an independent application supporting a video conference but no application supporting a data conference integrated with the application supporting a video conference, and thus is unable to send the data conference creation request to the data conference server end after establishing the point-to-point video conference. However, an independent application supporting a data conference may be installed in the conventional terminal to participate in the data conference.

In the embodiment, the video conference terminal executing the conference creation method may be a calling party, or a called party. In an implementation mode, the two parties of the established point-to-point video conference may negotiate to determine the specific party initiating the data conference creation request to the data conference server end. For example, if it is found by the negotiation between the two parties of the conference that both parties of the conference are video conference terminals, any party of the conference may initiate the data conference creation request. If it is found by the negotiation between the two parties of the conference that the opposite-end device is the conventional terminal, the video conference terminal is determined to initiate the data conference creation request.

In an implementation mode, the identity identifier is obtained during the establishment of the point-to-point video conference. Specifically, the calling party calls the called party during the establishment of the point-to-point video conference. A point-to-point video call supports a call between Session Initiation Protocol (SIP) accounts or H323 protocol accounts, or a call between Internet Protocol (IP) addresses. After successful calling of the calling party, the two parties may establish the point-to-point video conference. During the point-to-point video call, the two parties may obtain identity identifiers of each other used in the establishment of the point-to-point conference. That is, the identity identifier may be a network account such as a SIP account or an H323 account. Alternatively, the identity identifier may be an IP address. In this implementation mode, if the video conference terminal establishes the point-to-point video conference with the opposite-end device through a network account, the identity identifier is the network account. If the video conference terminal establishes the point-to-point video conference with the opposite-end device through an IP address, the identity identifier is the IP address. That is, in this implementation mode, either the calling party or the called party may obtain the identity identifier of the opposite party during the point-to-point video call. However, the present application is not limited thereto. In another implementation mode, the identity identifier in the data conference creation request may not be the identity identifier of the opposite party obtained during the point-to-point video call. For example, if the video conference terminal establishes the point-to-point video conference with the opposite-end device through an IP address, the identity identifier may also be a network account. That is, the video conference terminal obtains the network account from the opposite-end device after establishing the point-to-point video conference based on the IP address. In addition, in another implementation mode, the identity identifier may also include both a network account and an IP address. Alternatively, the identity identifier may also be represented by other information capable of uniquely representing an identity. When the identity identifier of the video conference terminal is an IP address of the video conference terminal, a network account corresponding to the IP address of the video conference terminal is obtained according to a pre-stored corresponding relationship between an IP address and a network account, and the video conference terminal is added to the data conference according to the network account of the video conference terminal.

After the video conference terminal transmits the data conference creation request to the data conference server end, the data conference server end may create the data conference corresponding to the point-to-point video conference according to the identity identifiers of the two parties of the conference. That is, the data conference server end creates a data conference, and may invite the two parties of the conference to access the data conference based on the identity identifiers of the two parties of the conference, so that the two parties of the conference may establish the data conference after establishing the point-to-point video conference. The data conference may be understood as a data conference corresponding to the point-to-point video conference. That the data conference server end may invite the two parties of the conference to access the data conference based on the identity identifiers of the two parties of the conference may specifically be as follows. The video conference terminal may be added to the data conference directly according to the identity identifier of the video conference terminal. For the opposite-end device, if the opposite-end device is also a video conference terminal, the opposite-end device is added to the data conference directly according to the identity identifier of the opposite-end device. If the opposite-end device is a conventional terminal, a conference access code of the opposite-end device may be generated, and the conference access code is sent to the video conference terminal to notify a user. The opposite-end device provides a data conference access interface through an independent application supporting a data conference therein, receives the conference access code input by the user through the data conference access interface, and transmits the conference access code and the identity identifier of the opposite-end device together to the data conference server end. The data conference server end allows the opposite-end device to access the data conference after confirming that the received conference access code and identity identifier are correct.

In the embodiment, the video conference terminal may send a data conference creation request to the data conference server end after establishing a point-to-point video conference with the opposite-end device, the data conference creation request including identity identifiers of two parties of the conference, so that the data conference server end may create a data conference corresponding to the point-to-point video conference according to the identity identifiers. That is, an application for supporting a video conference in the video conference terminal may cooperate with an application for supporting a data conference, so that the point-to-point video conference supports the data conference, and the operational performance of the point-to-point video conference is improved.

Figure 2:
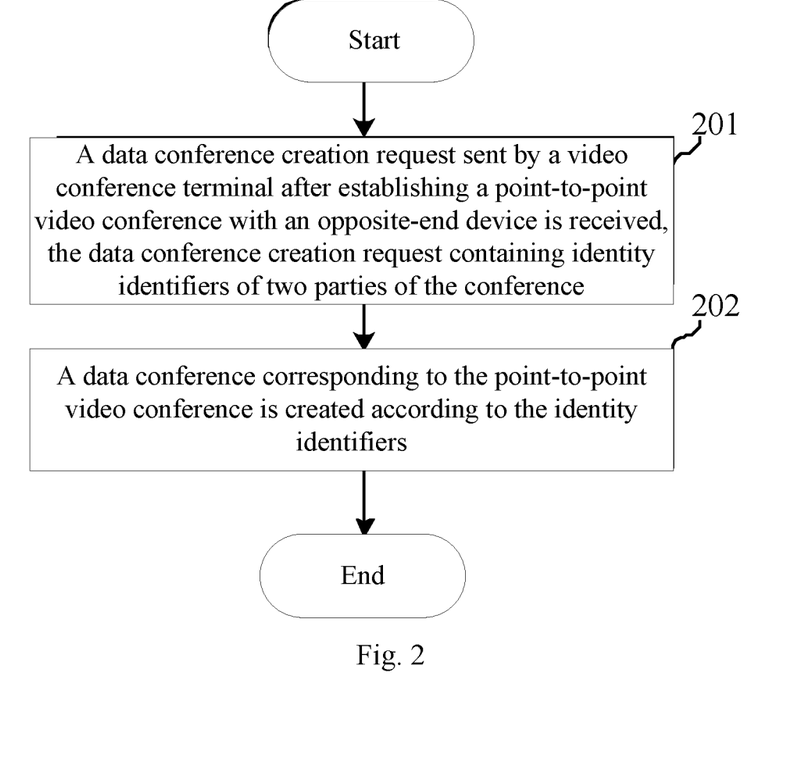
FIG. 2 is a flowchart of a conference creation control method according to a second embodiment of the present disclosure.

A second embodiment of the present disclosure relates to a conference creation method, which is applied to a data conference server end. The method is applied to the data conference server end. A specific flow is shown in FIG. 2.

In Step 201, a data conference creation request sent by a video conference terminal after establishing a point-to-point video conference with an opposite-end device is received, the data conference creation request containing identity identifiers of two parties of the conference, and the two parties of the conference including the video conference terminal and the opposite-end device.

In Step 202, a data conference corresponding to the point-to-point video conference is created according to the identity identifiers.

Figure 3:
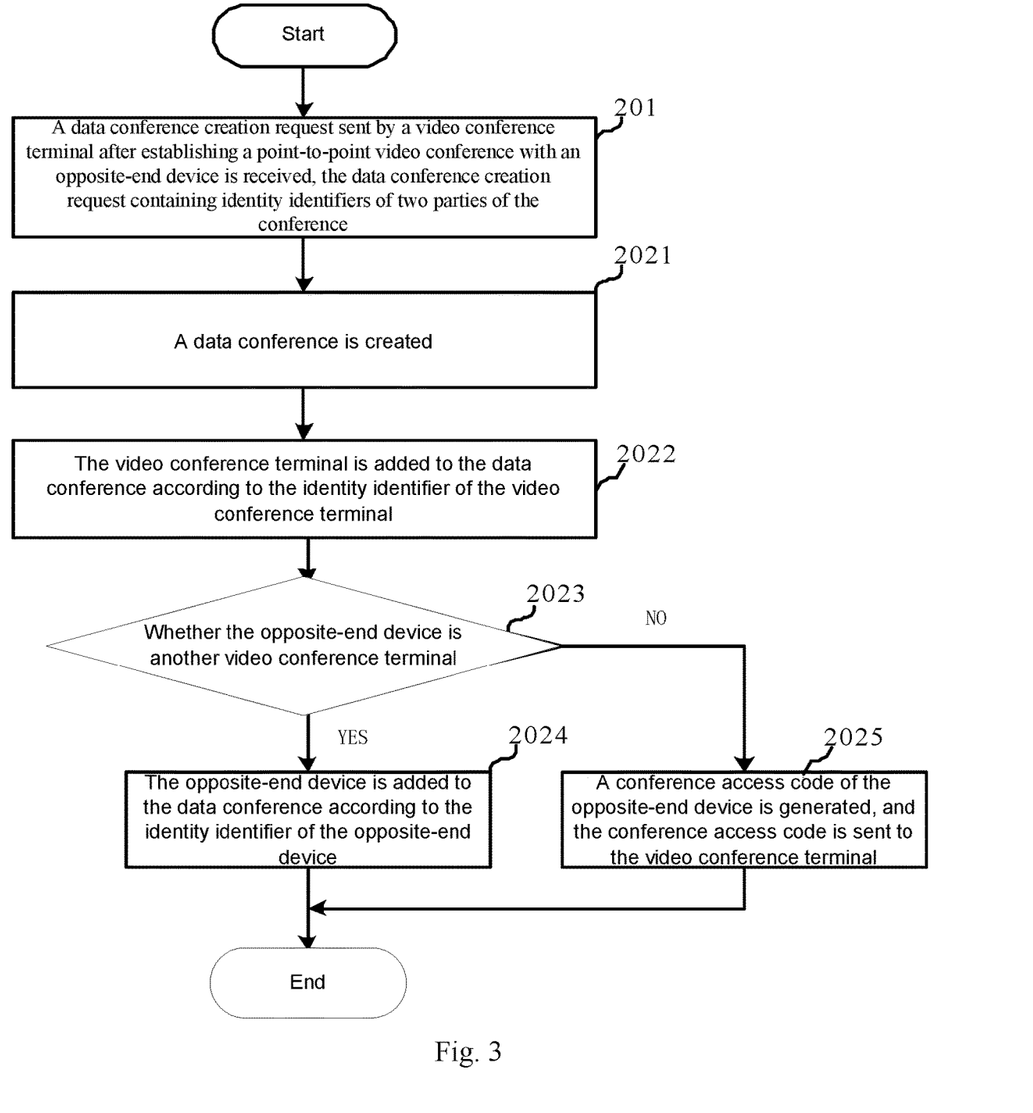
FIG. 3 is a specific flowchart of an implementation mode of the conference creation control method according to the second embodiment of the present disclosure.

In an implementation mode, as shown in FIG. 3, Step 202 may include the following steps.

In Step 2021, a data conference is created.

In Step 2022, the video conference terminal is added to the data conference according to the identity identifier of the video conference terminal.

In Step 2023, whether the opposite-end device is another video conference terminal is judged. If YES, Step 2024 is performed. If NO, Step 2025 is performed.

In Step 2024, the opposite-end device is added to the data conference according to the identity identifier of the opposite-end device.

In Step 2025, a conference access code of the opposite-end device is generated, and the conference access code is sent to the video conference terminal to notify a user, so that the opposite-end device accesses the data conference according to the conference access code and an identity identifier of the opposite-end device after receiving the conference access code input by the user through a data conference access interface of the opposite-end device.

An execution sequence of Steps 2022 and 2023 is not limited in the embodiment.

Specifically, the data conference server end, after receiving the data conference creation request, may create a data conference, and judge whether the opposite-end device is a video conference terminal. Specifically, the data conference server end may judge whether the opposite-end device is a video conference terminal according to the identity identifier of the opposite-end device.

If the opposite-end device is a video conference terminal, it indicates that both parties of the conference are video conference terminals, and may be added to the data conference directly by the data conference server end based on the identity identifiers.

If the opposite-end device is not a video conference terminal, it indicates that the opposite-end device is a conventional terminal that may not be added to the data conference directly by the data conference server end. In such case, the data conference server end may add the video conference terminal to the data conference directly based on the identity identifier of the video conference terminal. For the conventional terminal, a conference access code of the conventional terminal may be generated, and the conference access code is sent to the video conference terminal. A user of the conventional terminal may obtain the conference access code through the video conference terminal. For example, the conference access code of the conventional terminal may be presented after being received by the video conference terminal, and is notified to the user of the conventional terminal by a user of the video conference terminal. Alternatively, the video conference terminal sends the conference access code of the conventional terminal to the conventional terminal actively through a preset platform after receiving the conference access code, and the conventional terminal presents the conference access code to notify the user. The preset platform is, for example, the short message platform or the WeChat platform.

An independent application supporting a data conference is installed in the conventional terminal. The application may provide a data conference access interface after being started, and the user may input the conference access code on the data conference access interface. The conventional terminal may send a data conference access request to the data conference server end after receiving the conference access code. The data conference access request may include the conference access code and an identity identifier of the conventional terminal. The data conference server end allows the conventional terminal to access the data conference after confirming that the conference access code and the identity identifier are correct.

In another implementation mode, in Step 2025, the data conference server end, after generating the conference access code of the conventional terminal, may further send the conference access code to the conventional terminal through a preset platform. A connecting interface of the preset platform may be pre-installed in the data conference server end. The preset platform may be, for example, the short message platform or the WeChat platform. The user may check the conference access code received by the conventional terminal, and input the conference access code through the data conference access interface.

The identity identifiers of the two parties of the conference in the data conference creation request may be network accounts, or IP addresses.

In an implementation mode, in case that a network account is taken as a unique identifier of a participant terminal in the data conference, if the identity identifiers of the two parties of the conference are network accounts of the two parties of the conference, the two parties of the conference may be added to the data conference directly based on the network accounts. If the identity identifiers of the two parties of the conference are IP addresses of the two parties of the conference, network accounts of the two parties of the conference need to be searched according to the IP addresses of the two parties of the conference. The data conference server end may pre-store a corresponding relationship between a network account and IP address of a terminal. The data conference server end may store the corresponding relationship during the first log-on of the terminal to the data conference server end. That is, when the terminal is registered in the data conference server end, the data conference server end may simultaneously obtain the network account and IP address of the terminal and establish the corresponding relationship therebetween.

In the embodiment, the video conference terminal may send a data conference creation request to the data conference server end after establishing a point-to-point video conference with the opposite-end device, the creation request including identity identifiers of two parties of the conference, so that the data conference server end may create a data conference corresponding to the point-to-point video conference according to the identity identifiers. That is, an application for supporting a video conference in the video conference terminal may cooperate with an application for supporting a data conference, so that the point-to-point video conference supports the data conference, and the operational performance of the point-to-point video conference is improved.

The first embodiment corresponds to the present embodiment, so that the present embodiment can be matched with the first embodiment for implementation. The related technical details mentioned in the first embodiment are still effective in the present embodiment, and the technical effects that may be achieved in the first embodiment may also be achieved in the present embodiment. For reducing repetitions, elaborations are omitted herein. Correspondingly, the related technical details mentioned in the present embodiment may also be applied to the first embodiment.

Figure 4:
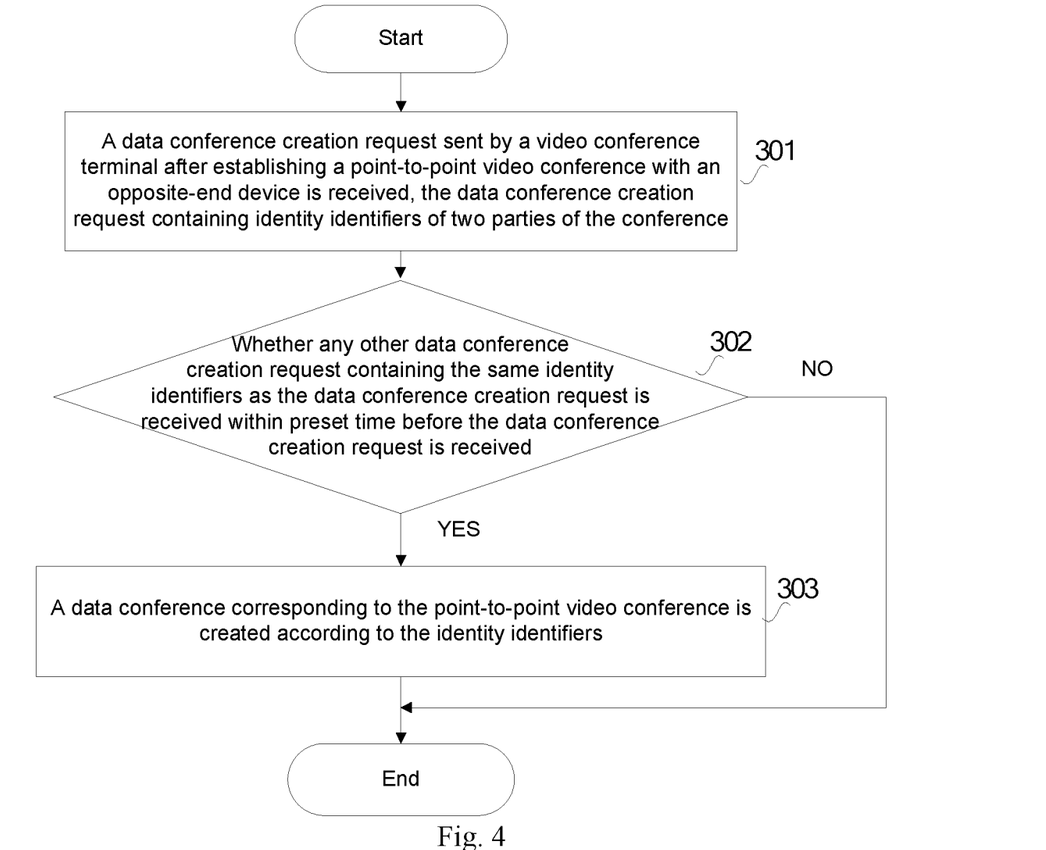
FIG. 4 is a flowchart of a conference creation control method according to a third embodiment of the present disclosure.

A third embodiment of the present disclosure relates to a conference creation method, which is applied to a data conference server end. A specific flow is shown in FIG. 4.

In Step 301, a data conference creation request sent by a video conference terminal after establishing a point-to-point video conference with an opposite-end device is received, the data conference creation request containing identity identifiers of two parties of the conference, and the two parties of the conference including the video conference terminal and the opposite-end device. Step 301 is similar to Step 201, and will not be elaborated herein.

In Step 302, whether any other data conference creation request containing the same identity identifiers as the data conference creation request is received within preset time before the data conference creation request is received is judged. If NO, Step 303 is performed. If YES, the flow is ended.

In Step 303, a data conference corresponding to the point-to-point video conference is created according to the identity identifiers. Step 303 is similar to Step 203, and will not be elaborated herein.

Compared with the second embodiment, the present embodiment includes Step 302 additionally. Specifically, when both parties of the conference are video conference terminals, both parties of the conference may send data conference creation requests to the data conference server end after establishing the point-to-point video conference. In such case, the data conference server end may receive two identical data conference creation requests. The two identical data conference creation requests contain the same identity identifiers of the two parties of the conference. In order to avoid the creation of two identical data conferences for the same point-to-point video conference, the data conference server end, every time when receiving a data conference creation request, may record receiving time of the data conference creation request.

After a data conference creation request is received presently, whether the presently received data conference creation request is the same as a previous data conference creation request may be judged first.

If the presently received data conference creation request is the same as the previous data conference creation request, whether a time difference between receiving time of the two identical data conference creation requests is greater than preset time is judged. The preset time may be set based on, for example, an estimated network delay. If the time difference is less than the preset time, it is determined in Step 302 that another data conference creation request containing the same identity identifiers as the data conference creation request is received within the preset time before the data conference creation request is received. In such case, the data conference server end determines that the presently received data conference creation request is ineffective, and does not perform any processing.

If the presently received data conference creation request is different from the previous data conference creation request, or they are the same but the time difference between the receiving time of the two identical data conference creation requests is greater than the preset time, it is determined in Step 302 that no other data conference creation request containing the same identity identifiers as the data conference creation is received within the preset time before the data conference creation request is received. In such case, the data conference server end determines that the presently received data conference creation request is effective, and performs Step 303.

According to the technical solution of the embodiment, the problem that both parties of the conference send data conference creation requests to the data conference server ends and thus the two parties of the conference repeatedly create data conferences may be solved, thereby avoiding unnecessary resource waste of the data conference server end.

Figure 5:
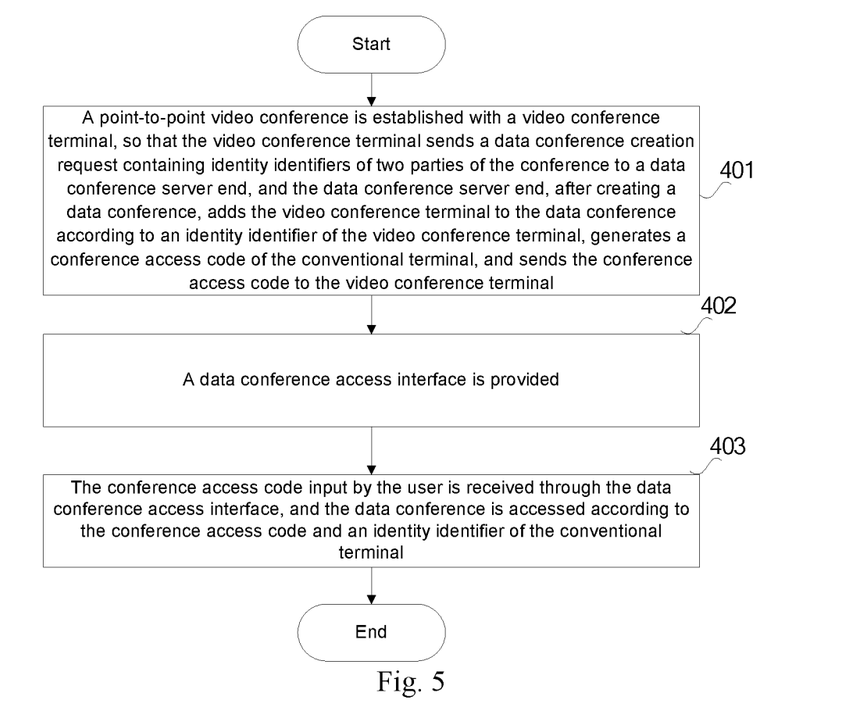
FIG. 5 is a flowchart of a conference creation control method according to a fourth embodiment of the present disclosure.

A fourth embodiment of the present disclosure relates to a conference creation method, which is applied to a conventional terminal. A specific flow is shown in FIG. 5.

In Step 401, a point-to-point video conference is established with a video conference terminal, so that the video conference terminal sends a data conference creation request containing identity identifiers of two parties of the conference to a data conference server end, and the data conference server end, after creating a data conference, adds the video conference terminal to the data conference according to an identity identifier of the video conference terminal, generates a conference access code of the conventional terminal, and sends the conference access code to the video conference terminal to notify a user.

In Step 402, a data conference access interface is provided.

In Step 403, the conference access code input by the user is received through the data conference access interface, and the data conference is accessed according to the conference access code and an identity identifier of the conventional terminal.

In the embodiment, two parties of a point-to-point video conference are the conventional terminal and the video conference terminal respectively. When the conventional terminal establishes the point-to-point video conference with the video conference terminal, the video conference terminal may obtain an identity identifier of the conventional terminal. After the point-to-point video conference is established, the video conference terminal may generate a data conference creation request containing identity identifiers of the two parties of the conference, and send the data conference creation request to the data conference server end. The data conference server end creates a data conference after receiving the data conference creation request. Then, the data conference server end may add the video conference terminal to the data conference directly, generate a conference access code of the conventional terminal, and send the conference access code to the video conference terminal to notify the user. Alternatively, the data conference server end may send the conference access code to the conventional terminal through a preset platform.

An independent application supporting a data conference is installed in the conventional terminal. The application may provide a data conference access interface after being started, and the user may input the conference access code on the data conference access interface. The conventional terminal may send a data conference access request to the data conference server end after receiving the conference access code. The data conference access request may contain the conference access code and the identity identifier of the conventional terminal. The data conference server end allows the conventional terminal to access the data conference after confirming that the conference access code and the identity identifier are correct. That the data conference server end confirms that the conference access code and the identity identifier are correct refers to that the data conference server end has stored a corresponding relationship between a conference access code of an opposite-end device and an identity identifier when generating the conference access code, judges whether the conference access code and identity identifier in the data conference access request are a corresponding conference access code and identity identifier recorded in the data conference server end after receiving the data conference access request sent by the conventional terminal, and if YES, confirms that the conference access code and the identity identifier are correct. In the embodiment, the preset platform is, for example, the short message platform or the WeChat platform.

In the embodiment, after the conventional terminal establishes a point-to-point video conference with the video conference terminal, the video conference terminal may send a data conference creation request to the data conference server end, the creation request including identity identifiers of two parties of the conference, so that the data conference server end may create a data conference corresponding to the point-to-point video conference according to the identity identifiers. That is, an application for supporting a video conference in the video conference terminal may cooperate with an application for supporting a data conference, so that the point-to-point video conference supports the data conference, and the operational performance of the point-to-point video conference is improved.

Any one of the first to third embodiments corresponds to the present embodiment, so that the present embodiment can be matched with any one of the first to third embodiments for implementation. The related technical details mentioned in any one of the first to third embodiments are still effective in the present embodiment, and the technical effects that may be achieved in any one of the first to third embodiments may also be achieved in the present embodiment. For reducing repetitions, elaborations are omitted herein. Correspondingly, the related technical details mentioned in the present embodiment may also be applied to any one of the first to third embodiments.

The steps of each of the above methods are divided only for clear description. During implementation, the steps may be combined into one step, or some steps may be split into multiple steps, and any solution including the same logical relationship falls within the scope of protection of the present disclosure. Adding insignificant modifications to the algorithm or flow or introducing insignificant designs without changing the core design of the algorithm or flow falls within the scope of protection of the present disclosure.

Figure 6:
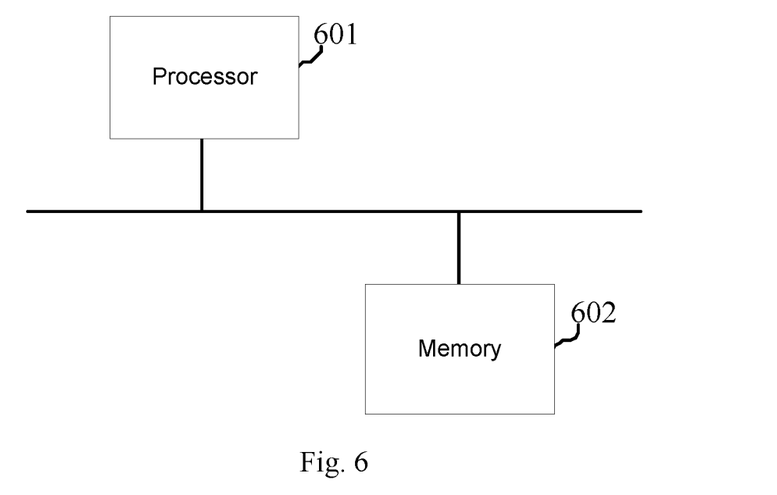
FIG. 6 is a block diagram of a video conference terminal according to a fifth embodiment of the present disclosure.

A fifth embodiment of the present disclosure relates to a video conference terminal, as shown in FIG. 6, including:

at least one processor 601; and a memory 602 in communication connection with the at least one processor 601.

The memory 602 stores an instruction executable for the at least one processor 601. The instruction is executed by the at least one processor 601 to enable the at least one processor 601 to execute the conference creation method as described in the first embodiment.

The memory 602 is connected with the processor 601 through a bus. The bus may include any number of interconnected buses and bridges. The bus connects various circuits of one or more processors 601 and the memory 602 together. The bus may also connect various other circuits such as a peripheral device, a voltage stabilizer, and a power management circuit. These are well known in the art, and thus further descriptions are omitted herein. A bus interface provides an interface between the bus and a transceiver. The transceiver may be one element, or multiple elements, e.g., multiple receivers and senders, and provides units configured to communicate with various other apparatuses through a transmission medium. Data processed by the processor 601 is transmitted on the transmission medium through an antenna. Furthermore, the antenna further receives data and transmits the data to the processor 601.

The processor 601 is responsible for managing the bus and general processing, and may also provide various functions, including timing, peripheral interface, voltage regulation, power management, and other control functions. The memory 602 may be configured to store data used by the processor 601 when executing operations.

A sixth embodiment of the present disclosure relates to a data conference server end, including:
at least one processor; and
a memory in communication connection with the at least one processor.

The memory stores an instruction executable for the at least one processor. The instruction is executed by the at least one processor to enable the at least one processor to execute the conference creation method as described in the second or third embodiment.

A block diagram of the data conference server end of the embodiment may refer to FIG. 6.

A seventh embodiment of the present disclosure relates to a conventional terminal, including:
at least one processor; and
a memory in communication connection with the at least one processor.

The memory stores an instruction executable for the at least one processor. The instruction is executed by the at least one processor to enable the at least one processor to execute the conference creation method as described in the fourth embodiment.

A block diagram of the conventional terminal of the embodiment may refer to FIG. 6.

An eighth embodiment of the present disclosure relates to a computer-readable storage medium, storing a computer program. The computer program is executed by a processor to implement the above-mentioned method embodiments.

That is, it can be understood by those skilled in the art that all or part of the steps of the methods in the above-mentioned embodiments may be completed by instructing related hardware through a program. The program is stored in a storage medium, including a plurality of instructions for enabling a device (which may be a single-chip microcomputer, a chip, etc.) or a processor to execute all or part of the steps of the method in each embodiment of the present application. The storage medium includes: various media capable of storing program codes such as a U disk, a mobile hard disk, a Read-Only Memory (ROM), a Random Access Memory (RAM), a magnetic disk, or an optical disk.

It can be understood by those of ordinary skill in the art that each of the above-mentioned embodiments is a specific embodiment implementing the present disclosure, and in practical applications, various variations about the form and details may be made thereto without departing from the spirit and scope of the present disclosure.

What is claimed is:

1. A conference creation method, comprising:
establishing a point-to-point video conference with an opposite-end device, and obtaining an identity identifier of the opposite-end device;
generating a data conference creation request containing identity identifiers of two parties of the conference, wherein the two parties of the conference comprise a video conference terminal and the opposite-end device; and
transmitting the data conference creation request to a data conference server end, so that the data conference server end determines that no other data conference creation request containing the same identity identifiers as the data conference creation request is received within preset time before the data conference creation request is received, and creates a data conference corresponding to the point-to-point video conference according to the identity identifiers of the two parties of the conference.

2. A conference creation method, comprising:
receiving a data conference creation request sent by a video conference terminal after establishing a point-to-point video conference with an opposite-end device, the data conference creation request containing identity identifiers of two parties of the conference, and the two parties of the conference comprising the video conference terminal and the opposite-end device;
determining that no other data conference creation request containing the same identity identifiers as the data conference creation request is received within preset time before the data conference creation request is received; and
creating a data conference corresponding to the point-to-point video conference according to the identity identifiers.

3. The conference creation method according to claim 2, wherein the creating a data conference corresponding to the point-to-point video conference according to the identity identifiers of the two parties of the conference comprises:
creating a data conference;
adding the video conference terminal to the data conference according to the identity identifier of the video conference terminal; and
adding, when the opposite-end device is another video conference terminal, the other video conference terminal to the data conference according to an identity identifier of the other video conference terminal.

4. The conference creation method according to claim 3, wherein the creating a data conference corresponding to the point-to-point video conference according to the identity identifiers of the two parties of the conference further comprises:
generating, when the opposite-end device is a conventional terminal, a conference access code of the conventional terminal, and sending the conference access code to the video conference terminal to notify a user, so that the conventional terminal accesses the data conference according to the conference access code and an identity identifier of the conventional terminal after receiving the conference access code input by the user through a data conference access interface of the conventional terminal.

5. The conference creation method according to claim 3, wherein the adding the video conference terminal to the data conference according to the identity identifier of the video conference terminal comprises:
obtaining, when the identity identifier of the video conference terminal is an Internet Protocol (IP) address of the video conference terminal, a network account corresponding to the IP address of the video conference terminal according to a pre-stored corresponding relationship between an IP address and a network account, and adding the video conference terminal to the data conference according to the network account of the video conference terminal.

6. A conference creation method, applied to a conventional terminal and comprising:
- establishing a point-to-point video conference with a video conference terminal, so that the video conference terminal sends a data conference creation request containing identity identifiers of two parties of the conference to a data conference server end, and the data conference server end determines that no other data conference creation request containing the same identity identifiers as the data conference creation request is received within preset time before the data conference creation request is received, creates a data conference, and adds the video conference terminal to the data conference according to an identity identifier of the video conference terminal, generates a conference access code of the conventional terminal, and sends the conference access code to the video conference terminal to notify a user;
- providing a data conference access interface; and
- receiving the conference access code input by the user through the data conference access interface, and access the data conference according to the conference access code and an identity identifier of the conventional terminal.

7. A video conference terminal, comprising:
at least one processor; and
a memory in communication connection with the at least one processor, wherein
the memory stores an instruction executable for the at least one processor; and the instruction is executed by the at least one processor to enable the at least one processor to execute the conference creation method according to claim 1.

8. A data conference server end, comprising:
at least one processor; and
a memory in communication connection with the at least one processor, wherein
the memory stores an instruction executable for the at least one processor; and the instruction is executed by the at least one processor to enable the at least one processor to execute the conference creation method according to claim 2.

9. A conventional terminal, comprising:
at least one processor; and
a memory in communication connection with the at least one processor, wherein
the memory stores an instruction executable for the at least one processor; and the instruction is executed by the at least one processor to enable the at least one processor to execute the conference creation method according to claim 6.

10. A computer-readable storage medium, storing a computer program which is executed by a processor to implement the conference creation method according to claim 1.

11. A data conference server end, comprising:
at least one processor; and
a memory in communication connection with the at least one processor, wherein
the memory stores an instruction executable for the at least one processor; and the instruction is executed by the at least one processor to enable the at least one processor to execute the conference creation method according to claim 3.

12. A data conference server end, comprising:
at least one processor; and
a memory in communication connection with the at least one processor, wherein
the memory stores an instruction executable for the at least one processor; and the instruction is executed by the at least one processor to enable the at least one processor to execute the conference creation method according to claim 4.

13. A data conference server end, comprising:
at least one processor; and
a memory in communication connection with the at least one processor, wherein
the memory stores an instruction executable for the at least one processor; and the instruction is executed by the at least one processor to enable the at least one processor to execute the conference creation method according to claim 5.

14. A non-transitory computer-readable storage medium, storing a computer program which is executed by a processor to implement the conference creation method according to claim 2.

15. A non-transitory computer-readable storage medium, storing a computer program which is executed by a processor to implement the conference creation method according to claim 3.

16. A non-transitory computer-readable storage medium, storing a computer program which is executed by a processor to implement the conference creation method according to claim 4.

17. A non-transitory computer-readable storage medium, storing a computer program which is executed by a processor to implement the conference creation method according to claim 6.

* * * * *